United States Patent
Scipione et al.

(10) Patent No.: US 9,161,300 B2
(45) Date of Patent: Oct. 13, 2015

(54) REDUCING ENERGY CONSUMPTION IN A BASESTATION BY SHUTTING OFF SECONDARY PILOT TRANSMISSION IN ABSENCE OF MIMO USERS

(71) Applicant: QUALCOMM Incorporated, San Diego, CA (US)

(72) Inventors: Mario Mark Scipione, Del Mar, CA (US); Sharad Deepak Sambhwani, San Diego, CA (US); Bibhu Prasad Mohanty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/597,500

(22) Filed: Jan. 15, 2015

(65) Prior Publication Data

US 2015/0133139 A1 May 14, 2015

Related U.S. Application Data

(62) Division of application No. 12/985,732, filed on Jan. 6, 2011, now Pat. No. 8,965,455.

(60) Provisional application No. 61/294,047, filed on Jan. 11, 2010.

(51) Int. Cl.
| | |
|---|---|
| *H04W 52/02* | (2009.01) |
| *H04W 52/34* | (2009.01) |
| *H04W 52/32* | (2009.01) |
| *H04B 7/04* | (2006.01) |

(Continued)

(52) U.S. Cl.
CPC ......... *H04W 52/0206* (2013.01); *H04B 7/0413* (2013.01); *H04W 52/0232* (2013.01); *H04W 52/325* (2013.01); *H04W 52/346* (2013.01); *H04W 72/0473* (2013.01); *H04W 88/08* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 7,239,886 | B2 | 7/2007 | Gross et al. |
| 8,139,672 | B2 | 3/2012 | Gore et al. |
| 2007/0133493 | A1 | 6/2007 | Maruhashi et al. |

(Continued)

FOREIGN PATENT DOCUMENTS

| | | |
|---|---|---|
| CN | 101138167 A | 3/2008 |
| CN | 101291478 A | 10/2008 |

(Continued)

OTHER PUBLICATIONS

3GPP, 4C-HSDPA, RP-090976, "Four carrier HSDPA", Alcatel-Lucent, Bouygues Telecom, China Unicom, Emobile, Ericsson, Orange/France Telecom, Qualcomm Europe, Softbank Mobile, T-Mobile USA, Vodafone, 2009, pp. 1-7.

(Continued)

*Primary Examiner* — Philip Sobutka
(74) *Attorney, Agent, or Firm* — Darren M. Simon

(57) ABSTRACT

A method for reducing energy consumption of a base station is described. A first pilot channel is transmitted via a first antenna using a first downlink power amplifier. A second pilot channel is transmitted via a second antenna using a second downlink power amplifier. It is determined that no multiple-input and multiple-output users are in a cell corresponding to the base station. The second pilot channel is shut off.

10 Claims, 11 Drawing Sheets

(51) Int. Cl.
*H04W 72/04* (2009.01)
*H04W 88/08* (2009.01)

(56) References Cited

U.S. PATENT DOCUMENTS

| | | | |
|---|---|---|---|
| 2009/0092111 | A1 | 4/2009 | Horn et al. |
| 2009/0124214 | A1 | 5/2009 | Zhang et al. |
| 2009/0285158 | A1 | 11/2009 | Rezaiifar et al. |
| 2009/0296643 | A1 | 12/2009 | Cave et al. |
| 2009/0316575 | A1 | 12/2009 | Gholmieh et al. |
| 2010/0105406 | A1 | 4/2010 | Luo et al. |
| 2010/0246461 | A1* | 9/2010 | Hsieh et al. .................. 370/311 |
| 2012/0015682 | A1 | 1/2012 | Scipione et al. |
| 2012/0108186 | A1* | 5/2012 | Goransson et al. ........... 455/101 |

FOREIGN PATENT DOCUMENTS

| | | |
|---|---|---|
| CN | 101500298 A | 8/2009 |
| JP | 2009081818 A | 4/2009 |
| WO | 2005093982 A1 | 10/2005 |
| WO | 2007038356 A1 | 4/2007 |
| WO | 2009136960 A2 | 11/2009 |

OTHER PUBLICATIONS

3GPP Draft; R1-084030, 25.212 CRO267R3, "Introduction of Dual-Cell HSDPA Operation on Adjacent Carriers", 3rd Generation Partnership Project (3GPP), Ericsson, Huawei, Nokia, Nokia Siemens Networks, Philips, Qualcommn Europe, Samsung, Mobile Competence Centre; 650, Route Deslucioles; F-06921 Sophia-antipolis cedex; France, no. prague, Czech Republic; 20081006, Oct. 6, 2008, XP050317326.
3GPP TSG RAN WG1 Meeting #56bis, R1-091544, "HS-DPCCH CQI design for three HSDPA carriers," Huawei, Ljubljana, Slovenia, Jan. 12-16, 2009, pp. 1-2.
3GPP TSG-RAN WG1 Meeting #54 , R1-083395, 25.211 CR0257r1 (Rel-8,B)V8.1.0, "25.211 CR0257r1 (Rel-8,B) Introduction of Dual-Cell HSDPA Operation on Adjacent Carriers", Ericsson, Huawei, Nokia, Nokia Siemens Networks, Philips, Qualcomm Europe, Samsung, Aug. 18-22, 2008, pp. 1-6.
3GPP TSG-RAN WG1 Meeting #54, R1-083396, 25.212 CR0267r1 (Rel-8,B), V.8.2.0, "25.211 CR0257r1 (Rel-8,B) Introduction of Dual-Cell HSDPA Operation on Adjacent Carriers", Ericsson, Huawei, Nokia, Nokia Siemens Networks, Philips, Qualcomm Europe, Samsung, Aug. 18-22, 2008, pp. 1-3.
3GPP TSG-RAN WG1 Meeting #54, R1-083397, 25.213 CR0095r1 (Rel-8,B), V.8.1.0, "25.211 CR0257r1 (Rel-8,B) Introduction of Dual-Cell HSDPA Operation on Adjacent Carriers", Ericsson, Huawei, Nokia, Nokia Siemens Networks, Philips, Qualcomm Europe, Samsung, Aug. 18-22, 2008, pp. 1-4.
3GPP TSG-RAN WG1 Meeting #54, R1-083398, 25.214 CR0497r1 (Rel-8,B), V8.2.0, "25.211 CR0257r1 (Rel-8,B) Introduction of Dual-Cell HSDPA Operation on Adjacent Carriers", Ericsson, Huawei, Nokia, Nokia Siemens Networks, Philips, Qualcomm Europe, Samsung, Aug. 18-22, 2008, pp. 1-7.
3GPP TSG-RAN WG1 Meeting #54bis, R1-084029, 25.211 CR0257R3 (Rel-8, B), V.8.2.0, "Introduction of Dual-Cell HSDPA Operation on Adjacent Carriers", Ericsson, Huawei, Nokia, Nokia Siemens Networks, Philips, Qualcomm Europe, Samsung, Sep. 29-Oct. 3, 2008, pp. 1-52.
3GPP TSG-RAN WG1 Meeting #54bis, R1-084031, 25.214 CR0497R4 (Rel-8, B), V.8.3.0, "25.214 CR0497R4 (Rel-8,B) Introduction of Dual-Cell HSDPA Operation on Adjacent Carriers", Ericsson, Huawei, Nokia, Nokia Siemens Networks, Philips, Qualcomm Europe, Samsung, Sep. 29-Oct. 3, 2008, pp. 1-86.
Ericsson, ST-Ericsson, "Extended Cell DTX for Enhanced Energy-Efficient Network Operation," 3GPP TSG-RAN WG1 #59, R1-095011, Nov. 2009.
International Search Report and Written Opinion—PCT/US2011/020890, ISA/EPO—Jun. 24, 2011.
Nokia Siemens Networks, "Dual HS-DPCCH coverage", 3GPP TSG-RAN WG1 Meeting #53bis, R1-082395, Jun. 30-Jul. 4, 2008, pp. 1-11.
Philips: 3GPP Draft, R1-082532, "Control channel support for HSDPA Dual-Cell operation", 3rd Generation Partnership Project (3GPP), Mobile Competence Centre, 650, Route Des Lucioles, F-06921 Sophia-Antipolis Cedex, France, vol. RAN WGI, no. Warsaw, Poland, 20080626, Jun. 26, 2008, 5 Pages, XP050110797, [retrieved on Jun. 26, 2008].
Qualcomm Europe: 3GPP Draft; R1-090034, "HS-DPCCH design framework for MC-HSDPA", 3rd Generation Partnership Project (3GPP), Mobile Competence Centre ; 650, Route Des Lucioles ; F-06921 Sophia-Antipolis Cedex ; France, no. Ljubljana; 20090107, Jan. 7, 2009, XP050317983, [retrieved on Jan. 7, 2009].
Qualcomm Europe, "Further HS-DPCCH Design Options and Cubic Metric Analysis for N_max_dpdch=1", 3GPP TSG-RAN WG1 Meeting #53bis , R1-082292, Jun. 30-Jul. 4, 2008, pp. 1-17.
Qualcomm Europe: "HS-DPCCH Design for CQI Feedback Cycle > 1", 3GPP TSG-RAN WG1#54 R1-082822, Aug. 2008, pp. 1-11, Internet <URL: http://www.3gpp.org/ftp/tsg_ran/WG1_RL1/TSGR1_54/Docs/R1-082822.zip>.
Qualcomm Europe, "Link Budget Impact due to DC-HSDPA operation", 3GPP TSG-RAN WG1 #53bis, R1-082293, Jun. 30-Jul. 4, 2008, pp. 1-7.
Samsung, "Uplink control channel for dual-cell HSDPA", 3GPP TSG RAN WG1 Meeting #53bis, R1-082324, Jun. 30-Jul. 4, 2008, pp. 1-3.
Taiwan Search Report—TW100101007—TIPO—Feb. 26, 2014.

* cited by examiner

REDUCING ENERGY CONSUMPTION IN A BASESTATION BY SHUTTING OFF SECONDARY PILOT TRANSMISSION IN ABSENCE OF MIMO USERS

CLAIM OF PRIORITY

The present application for patent is a Divisional and claims priority to patent application Ser. No. 12/985,732 entitled "APPARATUS AND METHOD FOR REDUCING ENERGY CONSUMPTION BY CELLULAR BASE STATIONS" filed Jan. 6, 2011, now allowed, which claims priority from U.S. Provisional Patent Application Ser. No. 61/294,047, filed Jan. 11, 2010, for "ENERGY SAVINGS IN CELLULAR BASE STATIONS," all of which are incorporated by reference herein.

TECHNICAL FIELD

The present disclosure relates generally to wireless communication systems. More specifically, the present disclosure relates to systems and methods for energy savings in cellular base stations.

BACKGROUND

Wireless communication systems are widely deployed to provide various types of communication content such as voice, video, data, and so on. These systems may be multiple-access systems capable of supporting simultaneous communication of multiple terminals with one or more base stations.

As precious natural resources are consumed, it has become beneficial to reduce the power consumption of computing devices. One such device where power consumption may be reduced is a base station.

Base stations are always on and always consuming power. Oftentimes portions of base stations are on when no wireless communication devices are near the base station or utilizing the services of the base station. Benefits may be realized by reducing the energy consumption of base stations.

SUMMARY

A method for reducing energy consumption of a base station is described. A first pilot channel is transmitted via a first antenna using a first downlink power amplifier. A second pilot channel is transmitted via a second antenna using a second downlink power amplifier. It is determined that no multiple-input and multiple-output users are in a cell corresponding to the base station. The second pilot channel is shut off.

Shutting off the second pilot channel may include shutting off the second downlink power amplifier. The base station may be a Node B. The method may be performed by a radio network controller via instructions sent to the base station. The first pilot channel and the second pilot channel may be used for multiple-input and multiple-output transmissions to a user equipment.

A method for reducing energy consumption of a base station is also described. The method includes communicating with one or more user equipments using n carriers. The method also includes determining that a load of one or more of the n carriers is below a carrier load threshold. One or more user equipments are redirected from the one or more carriers with loads below the carrier load threshold to one or more other carriers. The one or more carriers with loads below the carrier load threshold are turned off.

Turning off the one or more carriers with loads below the carrier load threshold may include turning off physical equipment corresponding to the one or more carriers with loads below the carrier load threshold. Physical equipment may include a downlink power amplifier. Physical equipment may also include at least one of channel cards, digital signal processors, field programmable gate arrays, application-specific integrated circuits, clocks and backhaul interface units on a baseband unit. The method may include communicating with the one or more user equipments using the one or more carriers with loads above the carrier load threshold.

Redirecting the one or more user equipments from the one or more carriers with loads below the carrier load threshold to the one or more carriers with loads above the carrier load threshold may include instructing the one or more user equipments to switch to a different modulation and coding scheme or to switch to a different frequency.

It may be determined whether a total load of the one or more carriers with loads above the carrier load threshold is above a combined carrier load threshold. If the total load of the one or more carriers with loads above the carrier load threshold is above the combined load threshold, a previously-switched-off carrier may be turned on and one or more user equipments may be redirected from the one or more carriers with loads above the carrier load threshold to the previously-turned-off carrier. Turning on the previously-switched-off carrier may include turning on physical equipment corresponding to the previously-switched-off carrier.

The method may be performed by the base station. The base station may be a Node B. The method may also be performed by a radio network controller (RNC) via instructions sent to the base station.

A method for reducing energy consumption of a base station is also described. The method includes communicating with one or more user equipments using one or more carriers. It is determined that a load of any of the one or more carriers is below a carrier load threshold. One or more baseband unit subunits to disable on the one or more carriers are determined. The one or more of the baseband unit subunits are disabled. The method further includes communicating with the one or more user equipments using the one or more carriers and only the baseband unit subunits that have not been disabled.

The method may further include determining that a load of any of the one or more carriers is above the carrier load threshold. One or more baseband unit subunits that have been disabled may be re-enabled. The baseband unit subunits may include channel cards, digital signal processors, field programmable gate arrays, application-specific integrated circuits, clocks and backhaul interface units. The base station may be a Node B. The method may be performed by a radio network controller (RNC) via instructions sent to the base station.

A wireless device configured for reducing energy consumption is described. The wireless device includes a processor, memory in electronic communication with the processor and instructions stored in the memory. The instructions are executable by the processor to transmit a first pilot channel via a first antenna using a first downlink power amplifier. The instructions are also executable by the processor to transmit a second pilot channel via a second antenna using a second downlink power amplifier. The instructions are further executable by the processor to determine that no multiple-input and multiple-output users are in a cell corresponding to the wireless device. The instructions are further executable by the processor to shut off the second pilot channel.

A wireless device configured for reducing energy consumption is also described. The wireless device includes a processor, memory in electronic communication with the processor and instructions stored in the memory. The instructions are executable by the processor to communicate with one or more user equipments using n carriers. The instructions are also executable by the processor to determine that a load of one or more of the n carriers is below a carrier load threshold. The instructions are further executable by the processor to redirect one or more user equipments from the one or more carriers with loads below the carrier load threshold to one or more other carriers. The instructions are also executable by the processor to turn off the one or more carriers with loads below the carrier load threshold.

A wireless device configured for reducing energy consumption is further described. The wireless device includes a processor, memory in electronic communication with the processor and instructions stored in the memory. The instructions are executable by the processor to communicate with one or more user equipments using one or more carriers. The instructions are also executable by the processor to determine that a load of any of the one or more carriers is below a carrier load threshold. The instructions are further executable by the processor to determine one or more baseband unit subunits to disable on the one or more carriers. The instructions are also executable by the processor to disable the one or more baseband unit subunits. The instructions are further executable by the processor to communicate with the one or more user equipments using the one or more carriers and only the baseband unit subunits that have not been disabled.

A wireless device configured for reducing energy consumption is described. The wireless device includes means for transmitting a first pilot channel via a first antenna using a first downlink power amplifier. The wireless device also includes means for transmitting a second pilot channel via a second antenna using a second downlink power amplifier. The wireless device further includes means for determining that no multiple-input and multiple-output users are in a cell corresponding to the wireless device. The wireless device also includes means for shutting off the second pilot channel.

A computer-program product for reducing energy consumption of a base station is described. The computer-program product includes a non-transitory computer-readable medium having instructions thereon. The instructions include code for causing a base station to transmit a first pilot channel via a first antenna using a first downlink power amplifier. The instructions also include code for causing the base station to transmit a second pilot channel via a second antenna using a second downlink power amplifier. The instructions further include code for causing the base station to determine that no multiple-input and multiple-output users are in a cell corresponding to the base station. The instructions also include code for causing the base station to shut off the second pilot channel.

A wireless device configured for reducing energy consumption is also described. The wireless device includes means for communicating with one or more user equipments using n carriers. The wireless device also includes means for determining that a load of one or more of the n carriers is below a carrier load threshold. The wireless device further includes means for redirecting one or more user equipments from the one or more carriers with loads below the carrier load threshold to one or more other carriers. The wireless device also includes means for turning off the one or more carriers with loads below the carrier load threshold.

A wireless device configured for reducing energy consumption is further described. The wireless device includes means for communicating with one or more user equipments using one or more carriers. The wireless device also includes means for determining that a load of any of the one or more carriers is below a carrier load threshold. The wireless device further includes means for determining one or more baseband unit subunits to disable on the one or more carriers. The wireless device also includes means for disabling the one or more baseband unit subunits. The wireless device further includes means for communicating with the one or more user equipments using the one or more carriers and only the baseband unit subunits that have not been disabled.

DETAILED DESCRIPTION

The $3^{rd}$ Generation Partnership Project (3GPP) is a collaboration between groups of telecommunications associations that aims to define a globally applicable $3^{rd}$ generation (3G) mobile phone specification. The 3GPP may define specifications for the next generation of mobile networks, mobile systems and mobile devices. In 3GPP, a mobile station or device may be referred to as a "user equipment" (UE).

Figure 1:
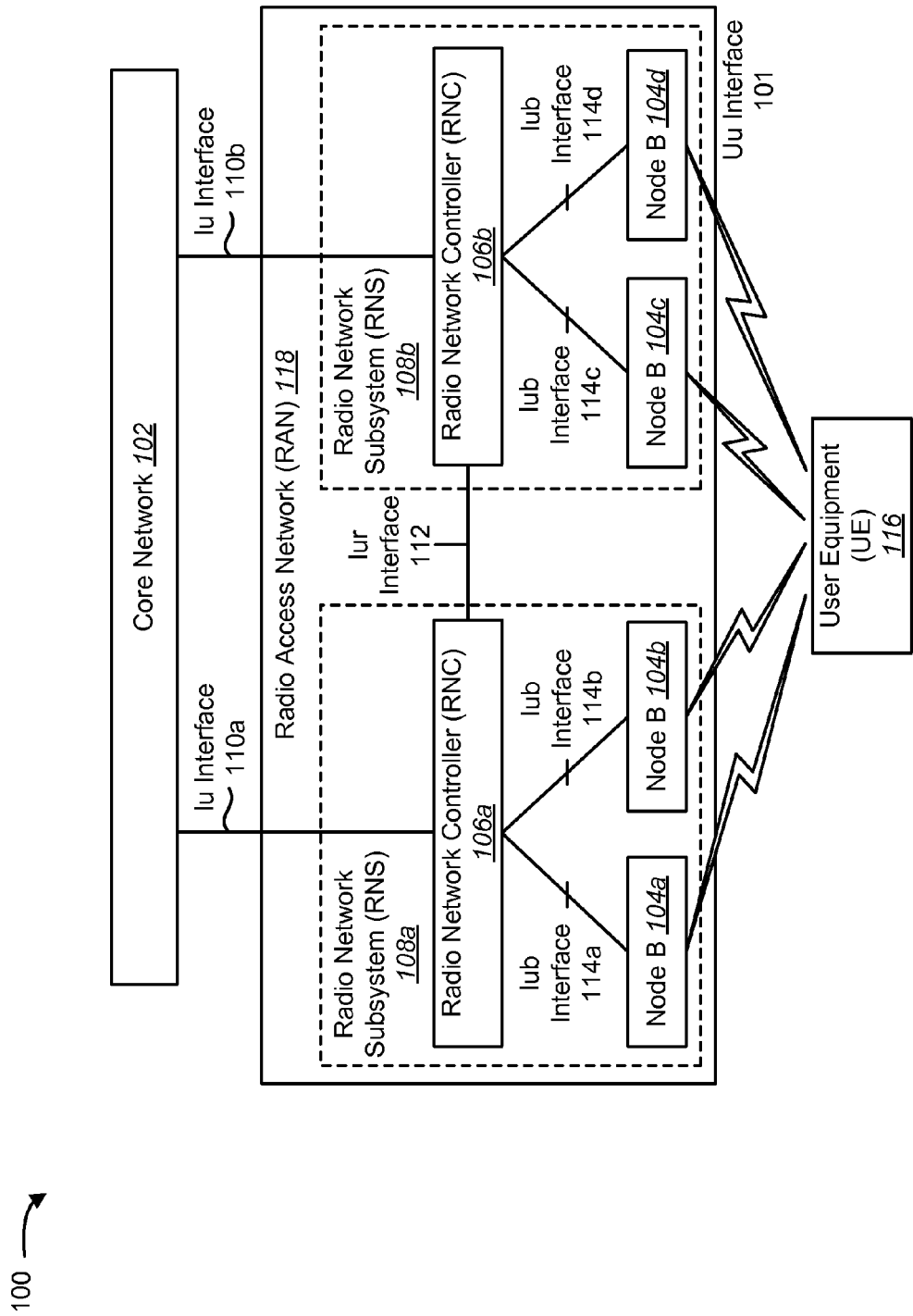
FIG. 1 shows a wireless communication system with multiple wireless devices.

FIG. 1 shows a wireless communication system 100 with multiple wireless devices. Wireless communication systems 100 are widely deployed to provide various types of communication content such as voice, data, and so on. A wireless device may be a Node B 104a-d or a user equipment (UE) 116.

The wireless communication system 100 may include a radio access network (RAN) 118 operating according to Universal Mobile Telecommunications System (UMTS). A radio access network (RAN) 118 may include one or more radio network subsystems (RNS) 108a-b. Each radio network subsystem (RNS) 108 may include one or more Node Bs 104 and one or more radio network controllers (RNCs) 106a-b. A radio access network (RAN) 118 may also be referred to as a "radio network" or an "access network." The radio access network (RAN) 118 may be a UMTS Terrestrial Radio Access Network (UTRAN). A UMTS Terrestrial Radio Access Network (UTRAN) is a collective term for the Node Bs 104 and the control equipment for the Node Bs 104 (or radio network controllers (RNCs) 106a-b) it contains which make up the UMTS radio access network (RAN) 118. This is a third generation (3G) communications network which can carry both real-time circuit-switched and internet protocol (IP) based packet switched traffic types. The UTRAN provides an air interface access method for the user equipment (UE) 116. Connectivity is provided between the user equipment (UE) 116 and a core network 102 by the UTRAN. The radio access network (RAN) 118 may transport data packets between multiple user equipments (UEs) 116.

The UTRAN may be connected internally or externally using four interfaces: the Iu interface 110a-b, the Uu interface 101, the Iub interface 114a-d and the Iur interface 112. The UTRAN may be attached to a Global System for Mobile Communications (GSM) core network 102 via an external interface referred to as the Iu interface 110. One or more radio network controllers (RNCs) 106 may support the Iu interface 110. In addition, a radio network controller (RNC) 106 may manage a set of base stations called Node Bs 104 through the Iub interfaces 114. The Iur interface 112 may connect two radio network controllers (RNCs) 106 with each other. The UTRAN is largely autonomous from the core network 102 since the radio network controllers (RNCs) 106 are interconnected by the Iur interface 112. The Uu interface 101 also connects the Node B 104 with a user equipment (UE) 116, while the Iub interface 114 is an internal interface that connects the radio network controller (RNC) 106 with the Node B 104.

The radio access network (RAN) 118 may be further connected to additional networks outside the radio access network (RAN) 118, such as a corporate intranet, the Internet or a conventional public switched telephone network (PSTN) and may transport data packets between each user equipment (UE) 116 and the outside networks.

Figure 2:
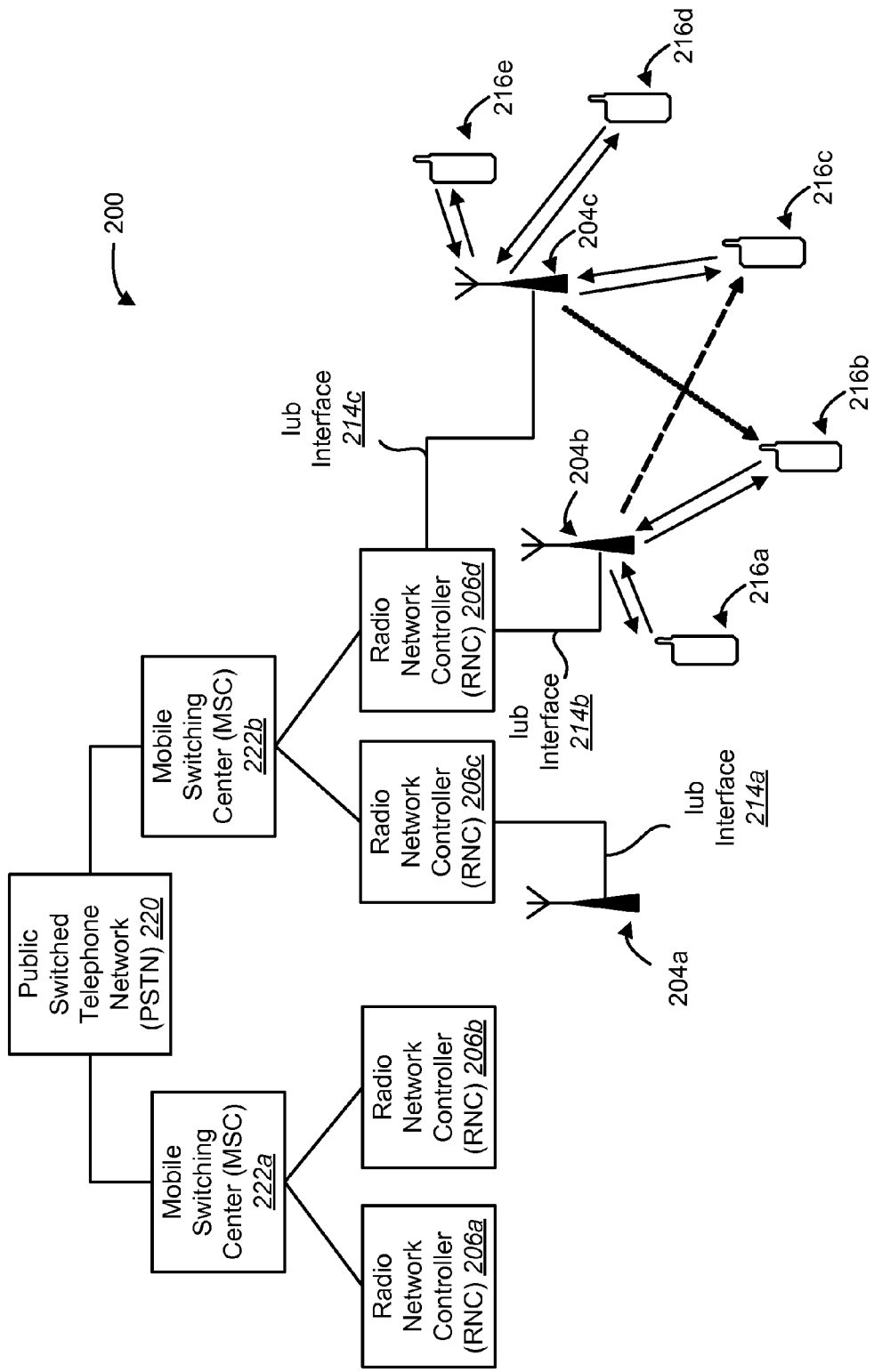
FIG. 2 is a block diagram illustrating selected components of a wireless communication system.

FIG. 2 is a block diagram illustrating selected components of a wireless communication system 200. The wireless communication system 200 may include radio network controllers (RNCs) 206a-d coupled to Node Bs 204a-c (also referred to as base stations or wireless base transceiver stations) via Iub interfaces 214a-c. The Node Bs 204 may communicate with user equipments (UEs) 216a-e through corresponding wireless connections. A user equipment (UE) 216 may also be referred to as a remote station, a mobile station or a subscriber station.

A communications channel may include a downlink for transmissions from a Node B 204 to a user equipment (UE) 216, and an uplink for transmissions from a user equipment (UE) 216 to a Node B 204. A radio network controller (RNC) 206 may provide control functionalities for one or more Node Bs 204. Each radio network controller (RNC) 206 may be coupled to a public switched telephone network (PSTN) 220 through a mobile switching center (MSC) 222a-b.

In one configuration, a radio network controller (RNC) 206 may be coupled to a packet switched network (PSN) (not shown) through a packet data server node (PDSN) (not shown). Data interchange between various network elements, such as a radio network controller (RNC) 206 and a packet data server node, can be implemented using any number of protocols, for example, the Internet Protocol (IP), an asynchronous transfer mode (ATM) protocol, T1, E1, frame relay and other protocols.

A radio network controller (RNC) 206 may fill multiple roles. For example, the radio network controller (RNC) 206 may control the admission of new mobiles or services attempting to use a Node B 204. The radio network controller (RNC) 206 may also control a Node B 204. Controlling admission ensures that user equipments (UEs) 216 are allocated radio resources (bandwidth and signal/noise ratio) up to what the network has available. It is where the Iub interface 214 terminates. A radio network controller (RNC) 206 may act as a serving radio network controller (RNC) 206 that terminates the user equipment's (UE's) 216 link layer communications. The serving radio network controller (RNC) 206 may also control the admission of new user equipments (UEs) or services attempting to use the core network 102 over the Iu interface 110.

In a multiple-input and multiple-output (MIMO) system, there are N (# of transmitter antennas) by M (# of receiver antennas) signal paths from the transmit and the receive antennas, and the signals on these paths are not identical. A multiple-input and multiple-output (MIMO) system creates multiple data transmission pipes. The pipes are orthogonal in the space-time domain. The number of pipes equals the rank of the system. Since these pipes are orthogonal in the space-time domain, they create little interference with each other. The data pipes are realized with proper digital signal processing by properly combining signals on the N×M paths. A transmission pipe may not correspond to an antenna transmission chain or any one particular transmission path.

Communication systems may use a single carrier frequency or multiple carrier frequencies. Each communication link between a user equipment (UE) 216 and a Node B 204a may incorporate a different number of carrier frequencies. A user equipment (UE) 216 may be any data device that communicates through a wireless channel. A user equipment (UE) 216 may be any of a number of types of devices including but not limited to a PC card, a compact flash, an external or internal modem, or a wireless phone. A user equipment (UE) 216 may be mobile or stationary.

A user equipment (UE) 216 that has established an active traffic channel connection with one or more Node Bs 204 is referred to as an active user equipment (UE) 216, and is said to be in a traffic state. A user equipment (UE) 216 that is in the process of establishing an active traffic channel connection with one or more Node Bs 204 is said to be in a connection setup state.

Figure 3:
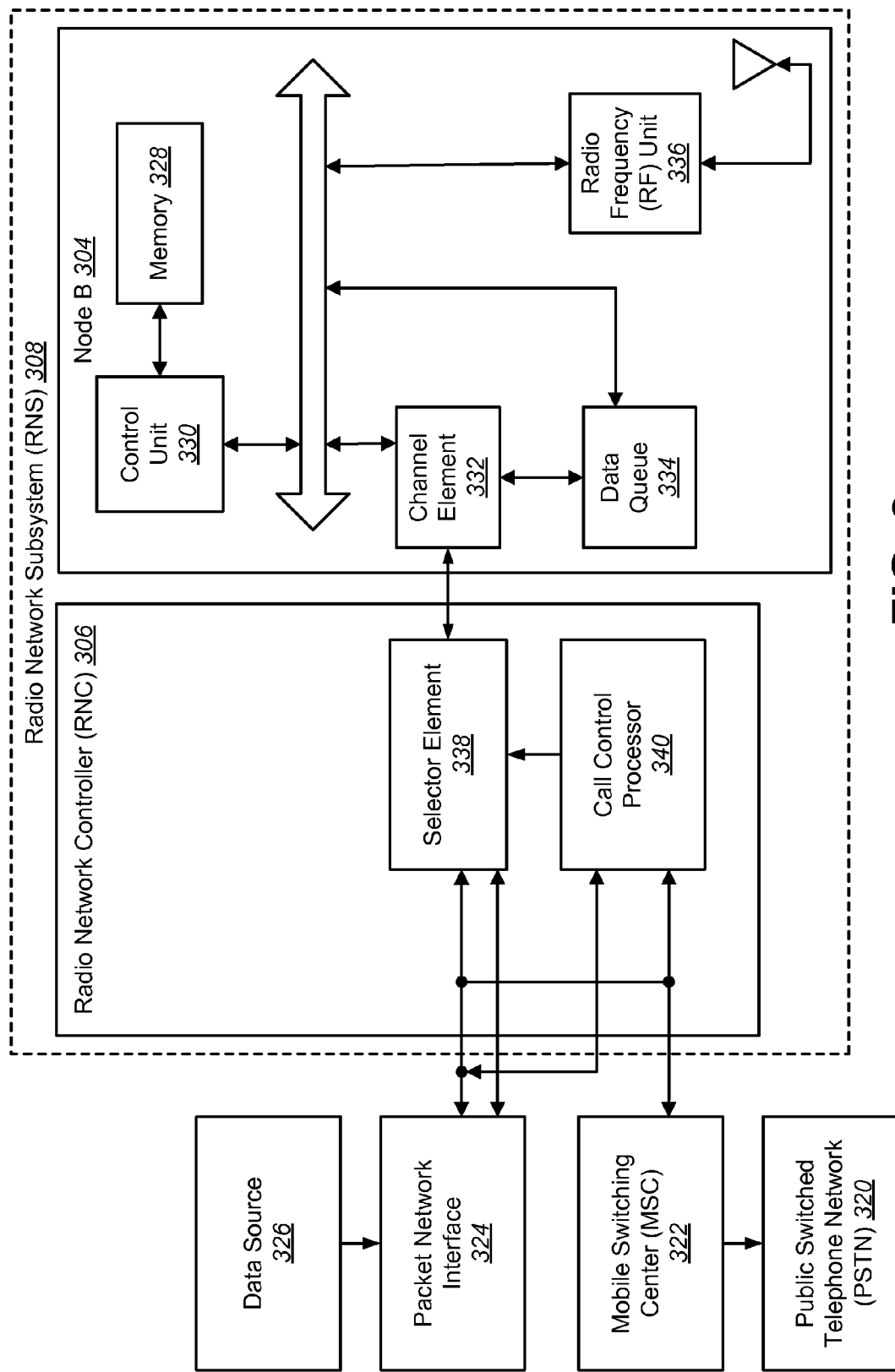
FIG. 3 is a block diagram illustrating a Node B and a radio network controller (RNC) interface with a packet network interface.

FIG. 3 is a block diagram illustrating a Node B 304 and a radio network controller (RNC) 306 interfaced with a packet network interface 324. Only one Node B 304 is shown for simplicity. The Node B 304 and the radio network controller (RNC) 306 may be part of a radio network subsystem (RNS) 308. The quantity of data to be transmitted by the Node B 304 to a user equipment (UE) 116 may be retrieved from a data queue 334 in the Node B 304 and provided to the channel element 332 for transmission to the user equipment (UE) 116 associated with the data queue 334 via a radio frequency (RF) unit 336.

The radio network controller (RNC) 306 interfaces with a Public Switched Telephone Network (PSTN) 320 through a mobile switching center (MSC) 322. Also, the radio network controller (RNC) 306 interfaces with a Node B 304. In addition, the radio network controller (RNC) 306 may interface with a Packet Network Interface 324. The radio network controller (RNC) 306 may coordinate the communication between a user equipment (UE) 116 in the communication system and other users connected to the packet network interface 324 and the public switched telephone network (PSTN) 320. The public switched telephone network (PSTN) 320 may interface with users through a standard telephone network (not shown).

The radio network controller (RNC) 306 may include many selector elements 338. Each selector element 338 may be assigned to control communication between one or more Node Bs 304 and one user equipment (UE) 116. If a selector element 338 has not been assigned to a given user equipment (UE) 116, a call control processor 340 may be informed of the need to page the user equipment (UE) 116. The call control processor 340 may then direct the Node B 304 to page the user equipment (UE) 116.

The data source 326 may include a quantity of data that is to be transmitted to a given user equipment (UE) 116. The data source 326 may provide the data to a packet network interface 324. The packet network interface 324 receives the data and routes the data to the selector element 338. The selector element 338 then transmits the data to a Node B 304 that is in communication with the target user equipment (UE) 116. Each Node B 304 may maintain a data queue 334 that stores the data to be transmitted to the user equipment (UE) 116.

For each data packet, the channel element 332 may insert the necessary control fields. In one configuration, the channel element 332 may perform a cyclic redundancy check (CRC) to encode the data packet and control fields and insert a set of code tail bits. The data packet, control fields, CRC parity bits and code tail bits form a formatted packet. In one configuration, the channel element 332 may then encode the formatted packet and interleave (or reorder) the symbols within the encoded packet. The interleaved packet may be covered with a Walsh code and spread with the short PNI and PNQ codes. The spread data is provided to a radio frequency (RF) unit 336 that quadrature modulates, filters and amplifies the signal. The downlink signal is transmitted over the air through an antenna to the user equipment (UE) 116.

The Node B 304 may include a control unit 330 and memory 328. The control unit 330 may control each of the components of the Node B 304 according to software stored in the memory 328.

Figure 4:
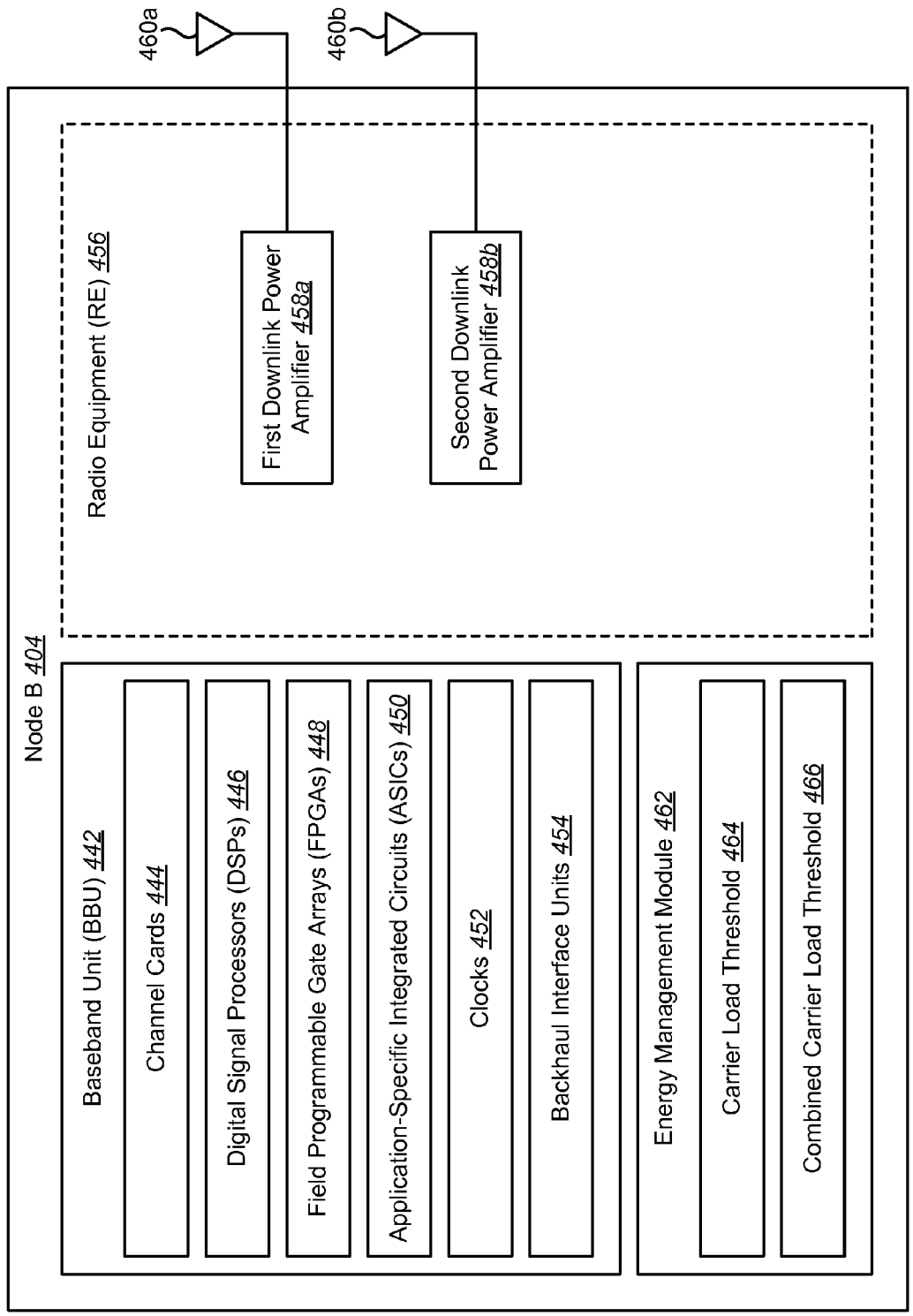
FIG. 4 is a block diagram of a Node B for use in the present systems and methods.

FIG. 4 is a block diagram of a Node B 404 for use in the present systems and methods. The Node B 404 of FIG. 4 may be one configuration of the Node Bs 104 illustrated in FIG. 1. In systems where multiple carriers have been deployed, energy management techniques may be introduced at the Node B 404 based on the measured traffic in the system.

Potential solutions enabling energy savings within a UMTS Node B 404 may exist. These solutions may consider the impacts on the time for legacy and new user equipments (UEs) 116 to gain access to service from a Node B 404 and the impacts on legacy and new user equipments (UEs) 116 (e.g., power consumption and mobility). Solutions that are backwards-compatible and non-backwards-compatible may both be considered.

A Node B 404 may include two basic building blocks: a baseband unit (BBU) 442 and a radio equipment (RE) 456. The baseband unit (BBU) 442 may also be referred to as a radio equipment control (REC). Both the baseband unit (BBU) 442 and the radio equipment (RE) 456 may be co-located in a conventional radio base station design. The baseband unit (BBU) 442 may include the radio functions of the digital baseband domain. The radio equipment (RE) 456 may include the analog radio frequency functions.

A baseband unit (BBU) 442 may include subunits such as channel cards 444, digital signal processors (DSPs) 446, field programmable gate arrays (FPGAs) 448, application specific integrated circuits (ASICs) 450, clocks 452 and backhaul interface units 454. Portions of these subunits may be turned off to save power when they are not needed. For example, a baseband unit (BBU) 442 may include three channel cards 444. Depending on the load, two of the channel cards 444 may be shut off to save power. Similarly, a subset of the E1s or T1s in the backhaul interface units 454 may be shut off.

The radio equipment (RE) 456 may include a first downlink power amplifier 458a coupled to a first antenna 460a. If the Node B 404 is used for multiple-input and multiple-output (MIMO) transmissions, the radio equipment (RE) 456 may also include a second downlink power amplifier 458b coupled to a second antenna 460b. In one configuration, a radio equipment (RE) 456 may include more than two downlink power amplifiers 458. For example, a Node B 404 may be using multiple carriers (non-MIMO) across multiple power amplifiers 458. The Node B 404 may shut off one or more downlink power amplifiers 458 to reduce the power consumption of the Node B 404. If the Node B 404 shuts off a carrier, the Node B 404 may shut off the downlink power amplifiers 458 associated with the carrier.

Reduction in energy consumption may be accomplished by determining the energy consumption breakdown in existing Node Bs 404, establishing Node B 404 energy saving targets and identifying solutions based on the existing Uu interface 101 that rely on Node B 404 implementation enhancements as well as UTRAN operation. If the targets are still not met, solutions may be identified that can help achieve the targets by way of modifications to 3GPP specifications. Each solution may need to be characterized based on the impact to the system.

The Node B 404 may include an energy management module 462. The Node B 404 may use the energy management module 462 to determine when to make adjustments that may reduce the energy consumption of the Node B 404. The energy management module 462 may include a carrier load threshold 464. The carrier load threshold 464 may be a preset threshold that defines the minimum carrier load when the Node B 404 shuts off one or more carriers or one or more subunits of the baseband unit (BBU) 442 to reduce the power consumption of the Node B 404. The energy management module 462 may also include a combined carrier load threshold 466. If the Node B 404 has shut off one or more carriers to conserve energy, the combined carrier load threshold 466 may be a preset maximum load on the carriers that are turned on before the Node B 404 turns a shut off carrier back on. The carrier load threshold 464 is discussed in additional detail below in relation to FIG. 6 and FIG. 7. The combined carrier load threshold 466 is discussed in additional detail below in relation to FIG. 6 and FIG. 7.

Figure 5:
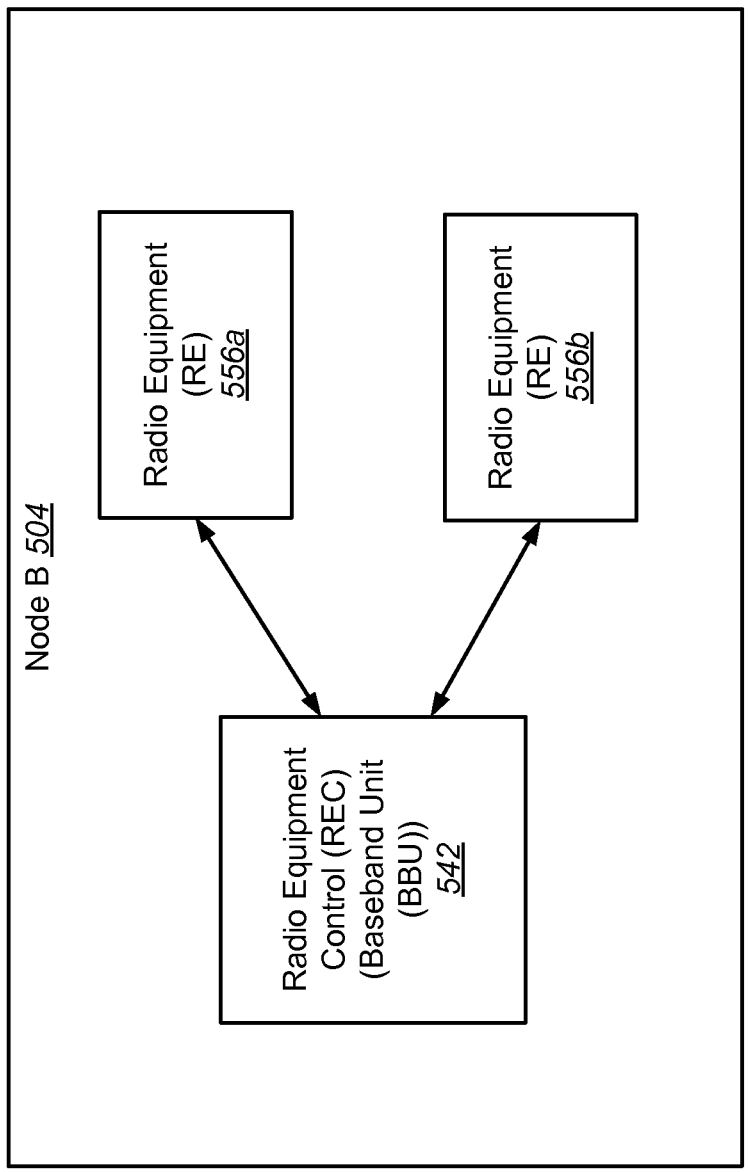
FIG. 5 is a block diagram of a Node B with multiple radio equipments (RE) that are separated from the radio equipment control (REC)

FIG. 5 is a block diagram of a Node B 504 with multiple radio equipments (RE) 556a-b that are separated from the radio equipment control (REC) 542. The radio equipment control (REC) 542 may be a Baseband Unit (BBU) 442. Each radio equipment (RE) 556 may be close to an antenna while the radio equipment control (REC) 542 is located in a conveniently accessible site. For the UMTS radio access network (RAN) 118, the radio equipment control (REC) 542 provides access to a radio network controller (RNC) 106 via the Iub interface 114, whereas the radio equipment (RE) 556 serves as the air interface, called the Uu interface 101, to the user equipment (UE) 116. Table 1 lists the functions performed both on the uplink and the downlink by the radio equipment control (REC) 542 and the radio equipment (RE) 556.

TABLE 1

| Functions of REC or BBU | | Functions of RE | |
|---|---|---|---|
| Downlink | Uplink | Downlink | Uplink |
| Radio base station control & management | | RRC Channel Filtering | |
| Iub transport | | D/A conversion | A/D conversion |
| Iub Frame protocols | | | |
| Channel Coding | Channel De-coding | Up Conversion | Down Conversion |
| Interleaving | De-Interleaving | ON/OFF control of each carrier | Automatic Gain Control |
| Spreading | De-spreading | Carrier Multiplexing | Carrier De-multiplexing |
| Scrambling | De-scrambling | Power amplification and limiting | Low Noise Amplification |
| MIMO processing | | | |
| Adding of physical channels | Signal distribution to signal processing units | Antenna supervision | |
| Transmit Power Control of each physical channel | Transmit Power Control & Feedback Information detection | RF filtering | RF filtering |
| Frame and slot signal generation (including clock stabilization) | | | |
| Reference Frequency Generation | | | |
| Measurements | | Measurements | |

Figure 6:
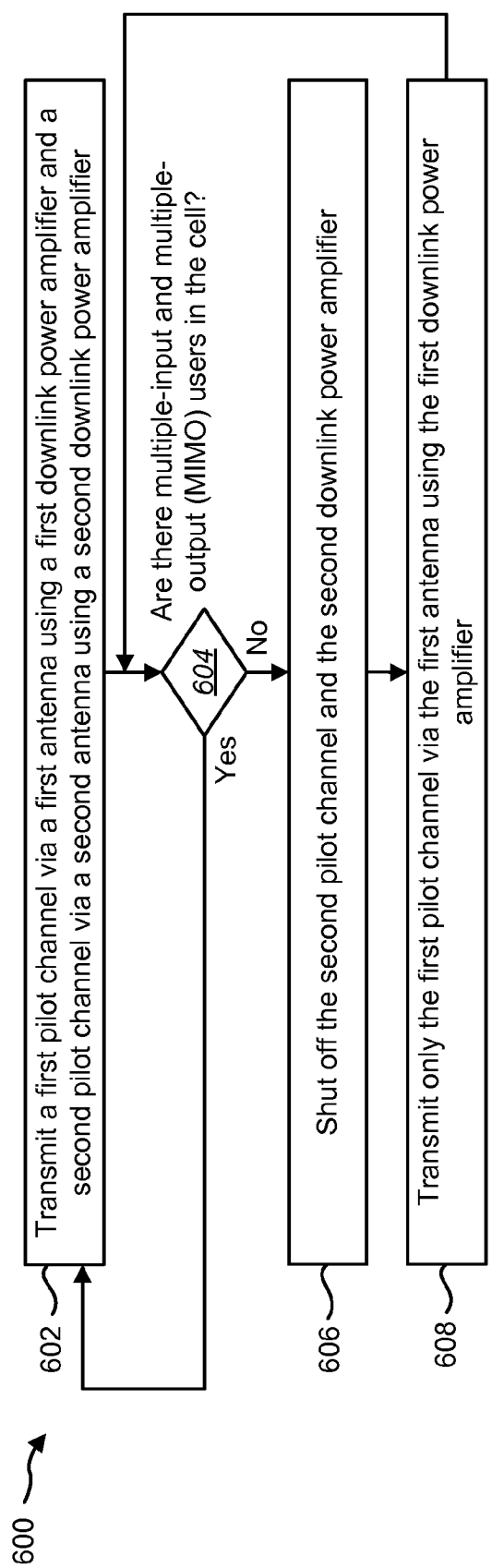
FIG. 6 is a flow diagram of a method for reducing power consumption of a Node B by switching off multiple-input and multiple-output (MIMO) transmissions.

FIG. 6 is a flow diagram of a method 600 for reducing power consumption of a Node B 404 by switching off multiple-input and multiple-output (MIMO) transmissions. The method 600 may be performed by a Node B 404. In one configuration, the method 600 may be performed by a radio network controller (RNC) 106 via instructions sent to a Node B 404. The Node B 404 may transmit 602 a first pilot channel via a first antenna 460a using a first downlink power amplifier 458a and a second pilot channel via a second antenna 460b using a second downlink power amplifier 458b. The pilot channels may be used for multiple-input and multiple-output (MIMO) transmissions to one or more user equipments (UEs) 116 that are in communication with the Node B 404.

The Node B 404 may determine 604 whether there are any multiple-input and multiple-output (MIMO) users in the cell. A multiple-input and multiple-output (MIMO) user may refer to a user equipment (UE) 116 that is within the boundaries covered by a Node B 404 that is capable/configured for multiple-input and multiple-output (MIMO) communications. If there are multiple-input and multiple-output (MIMO) users in the cell, the Node B 404 may continue transmitting 602 both the first pilot channel via the first antenna 460a using the first downlink power amplifier 458a and the second pilot channel via the second antenna 460b using the second downlink power amplifier 458b.

If there are no multiple-input and multiple-output (MIMO) users in the cell, the Node B 404 may shut off 606 the second pilot channel and the second downlink power amplifier 458b. This may lead to significant energy savings. The Node B 404 may thus reduce the power consumption of the Node B 404 by eliminating the power used by the second power amplifier 458b to transmit the second pilot channel during times when the second pilot channel is not needed. The Node B 404 may transmit 608 only the first pilot channel via the first antenna 460a using the first downlink power amplifier 458a. The Node B 404 may then again determine 604 whether there are any multiple-input and multiple-output (MIMO) users in the cell.

Figure 7:
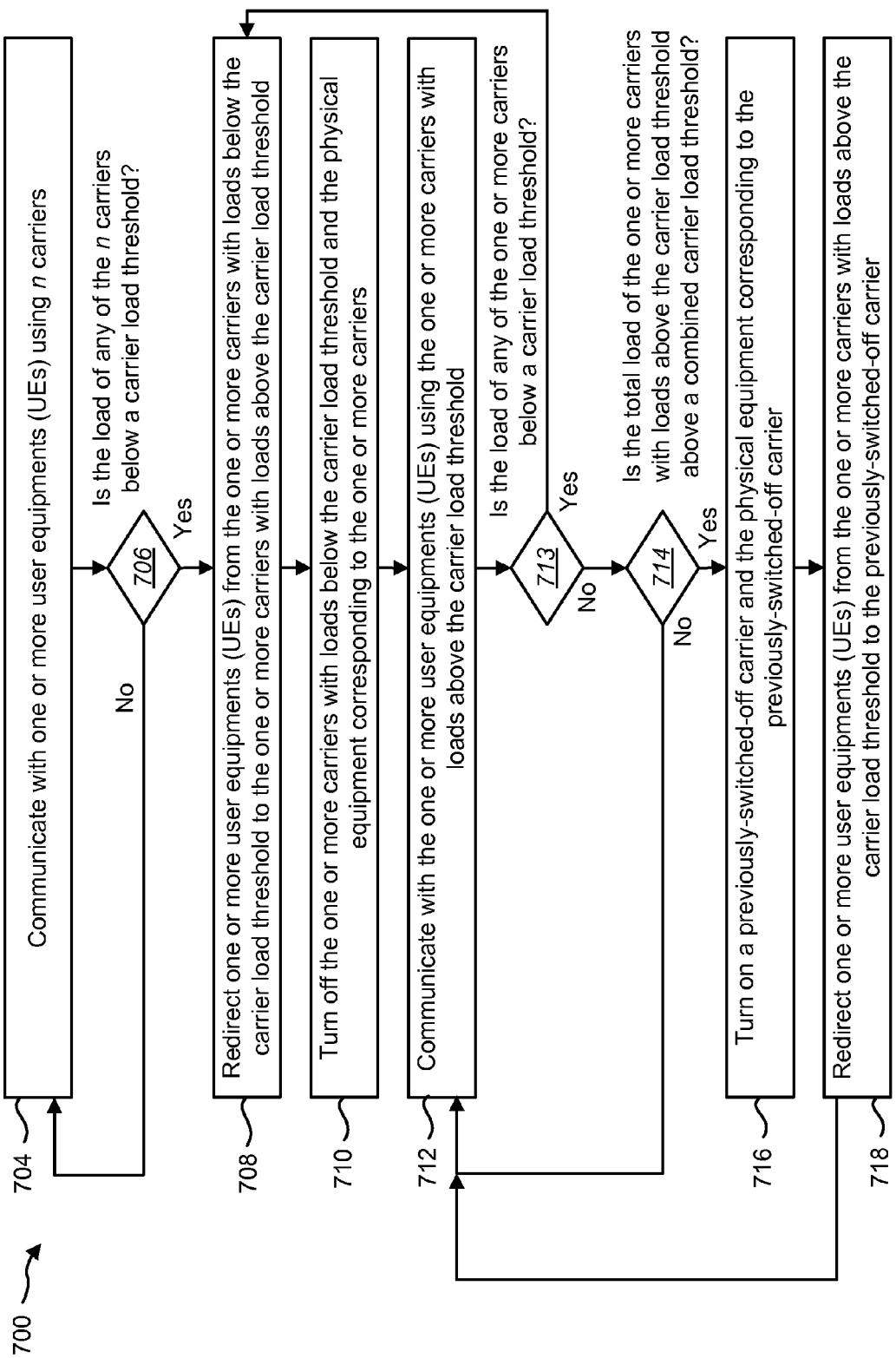
FIG. 7 is a flow diagram of a method for reducing power consumption of a Node B by shutting off one or more carriers.

FIG. 7 is a flow diagram of a method 700 for reducing power consumption of a Node B 404 by shutting off one or more carriers. The method 700 may be performed by a Node B 404. In one configuration, the method 700 may be performed by a radio network controller (RNC) 106 via instructions sent to a Node B 404. The Node B 404 may communicate 704 with one or more user equipments (UEs) 116 using n carriers.

The Node B 404 may determine 706 whether the load of any of the n carriers is below a carrier load threshold 464. The carrier load threshold 464 may be a preset threshold that defines the minimum number of user equipments (UEs) 116 utilizing a carrier before the Node B 404 redirects the user equipments (UEs) 116 to another carrier and shuts off the carrier. A user equipment (UE) 116 may be either a single-carrier user equipment (UE) 116 or a user equipment (UE) 116 that is capable of communicating with a Node B 404 using multiple carriers.

If the load of none of the n carriers is below the carrier load threshold 464, the Node B 404 may continue communicating 704 with the one or more user equipments (UEs) 116 using the n carriers. If the load of any of the carriers is below the carrier load threshold 464, the Node B 404 may redirect 708 one or more user equipments (UEs) 116 from the one or more carriers with loads below the carrier load threshold 464 to the one or more carriers with loads above the carrier load threshold 464 (this may apply until only one carrier remains). In one configuration, the Node B 404 may redirect 708 the one or more user equipments (UEs) 116 from the one or more carriers with loads below the carrier load threshold 464 to one or more carriers with loads that are currently below the carrier load threshold 464 (but that will have loads above the carrier load threshold 464 once the user equipments (UEs) 116 are redirected to them). Redirecting 708 the one or more user equipments (UEs) 116 from a carrier with a load below the carrier load threshold 464 to one or more carriers with loads above the carrier load threshold 464 may include instructing the one or more user equipments (UEs) 116 to switch to a different modulation and coding scheme and a different frequency. In one configuration, the Node B 404 may redirect the one or more user equipments (UEs) 116 to multiple carriers (i.e., not all the user equipments (UEs) 116 will go to the same carrier). In another configuration, the Node B 404 may reduce the amount of carriers that a user equipment (UE) 116 is configured for (i.e., if there is a small number of user equipments (UEs) 116 that can communicate using three different carriers and not enough data demand (from the mix of user equipment (UE) 116 types and quantity), the Node B 404 may reconfigure those multi-carrier user equipments (UEs) 116 to use only one or two carriers and shut off the extra carrier(s)).

The Node B 404 may then turn off 710 the one or more carriers with loads below the carrier load threshold and the physical equipment corresponding to the one or more carriers. By turning off one or more carriers during periods where the load is minimal, all or parts of the baseband unit (BBU) 442 and radio equipment (RE) 456 may be turned off, leading to a potentially large reduction in energy consumption at the Node B 404. The Node B 404 may communicate 712 with the one or more user equipments (UEs) 116 using the one or more carriers with loads above the carrier load threshold 464.

The Node B 404 may determine 713 whether the load of any of the one or more carriers is below the carrier load threshold 464. If the load of any of the one or more carriers is below the carrier load threshold 464, the Node B 404 may redirect 708 the one or more user equipments (UEs) 116 from the one or more carriers with loads below the carrier load threshold 464 to the one or more carriers with loads above the carrier load threshold 464. If the load of none of the n carriers is below the carrier load threshold 464, the Node B 404 may determine 714 whether the total load of the one or more carriers with loads above the carrier load threshold 464 is above a combined carrier threshold 466. The combined carrier threshold 466 may be a threshold used by the Node B 404 to determine when to resume communications using a previous-switched-off carrier after the previously-switched-off carrier has been turned off to reduce energy consumption.

If the total load of the one or more carriers is not above the combined carrier threshold 466, the Node B 404 may continue communicating 712 with the one or more user equipments (UEs) 116 using the one or more carriers with loads above the carrier load threshold 464. If the total load of the one or more carriers is above the combined carrier threshold 466, the Node B 404 may turn on 716 a previously-switched-off carrier and the physical equipment corresponding to the previously-switched-off carrier. The Node B 404 may next redirect 718 one or more user equipments (UEs) 116 from the one or more carriers with loads above the carrier load threshold 464 to the previously-switched-off carrier. The Node B 404 may then communicate 712 with the one or more user equipments (UEs) 116 using the one or more carriers with loads above the carrier load threshold 464.

Figure 8:
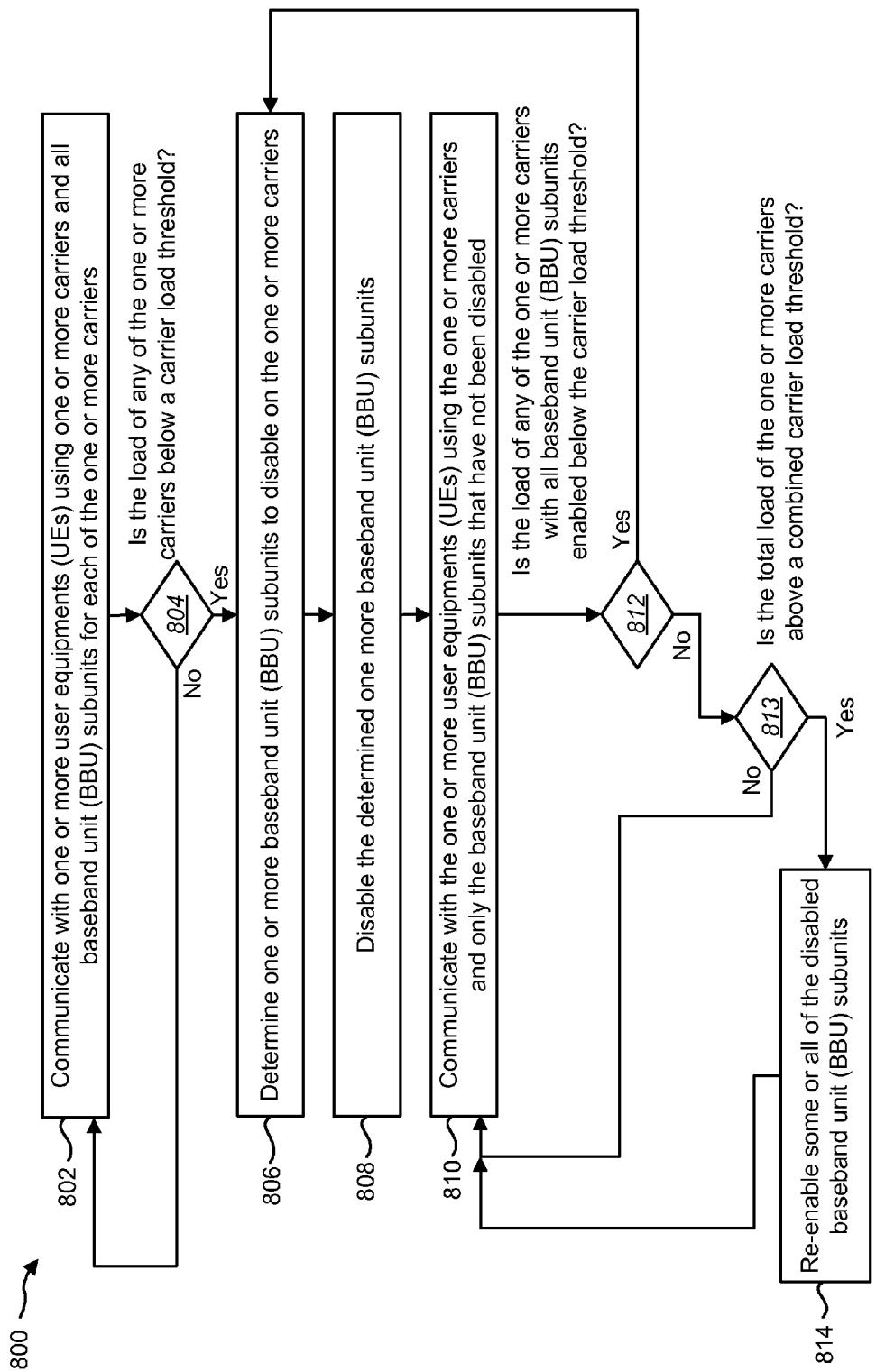
FIG. 8 is a flow diagram of a method for disabling baseband unit (BBU) subunits to reduce energy consumption on a Node B.

FIG. 8 is a flow diagram of a method 800 for disabling baseband unit (BBU) 442 subunits to reduce energy consumption on a Node B 404. The method 800 may be performed by a Node B 404. In one configuration, the method 800 may be performed by a radio network controller (RNC) 106 via commands to the Node B 404. The Node B 404 may communicate 802 with one or more user equipments (UEs) 116 using one or more carriers and all baseband unit (BBU) 442 subunits for each of the one or more carriers. The Node B 404 may determine 804 whether the load of any of the one or more carriers is below a carrier load threshold 464. If the load of any of the one or more carriers is not below a carrier load threshold 464, the Node B 404 may continue communicating 802 with the one or more user equipments (UEs) 116 using the one or more carriers and all the baseband unit (BBU) 442 subunits for each of the one or more carriers.

If the load of any of the one or more carriers is below a carrier load threshold 464, the Node B 404 may determine 806 one or more baseband unit (BBU) 442 subunits to disable on the one or more carriers. For example, the Node B 404 may determine to disable channel cards 444, digital signal processors (DSPs) 446, field programmable gate arrays (FPGAs) 448, application-specific integrated circuits (ASICs) 450 or clocks 452 as a function of the load. The Node B 404 may also determine to disable backhaul interface units 454. In one configuration, the Node B 404 may determine 806 to disable the same baseband unit (BBU) 442 subunit for each of the one or more carriers. In another configuration, the Node B 404 may determine 806 different baseband unit (BBU) 442 subunits to disable for each carrier of the one or more carriers. The Node B 404 may then disable 808 the determined one or more baseband unit (BBU) 442 subunits. The Node B 404 may next communicate 810 with the one or more user equipments (UEs) 116 using the one or more carriers and only the baseband unit (BBU) 442 subunits that have not been disabled. In one configuration, the Node B 404 may use multiple carrier load thresholds 464 to iteratively shut off baseband unit (BBU) 442 subunits.

The Node B 404 may determine 812 whether the load of any of the one or more carriers with all baseband unit (BBU) 442 subunits enabled is below the carrier load threshold 464. If the load of any of the one or more carriers with all baseband unit (BBU) 442 subunits enabled is below the carrier load threshold 464, the Node B 404 may determine 806 one or more baseband unit (BBU) 442 subunits to disable on the one or more carriers. If none of the one or more carriers with all baseband unit (BBU) 442 subunits enabled has a load below the carrier load threshold 464, the Node B 404 may determine 813 whether the total load of the one or more carriers is above a combined carrier load threshold 466. If the total load of the one or more carriers is not above the combined carrier load threshold 466, the Node B 404 may continue communicating 810 with the one or more user equipments (UEs) 116 using the one or more carriers and only the baseband unit (BBU) 442 subunits that have not been disabled. If the total load of the one or more carriers is above the combined carrier load threshold 466, the Node B 404 may re-enable 814 some or all of the disabled baseband unit (BBU) 442 subunits. The Node B 404 may then return to communicating 810 with the one or more user equipments (UEs) 116 using the one or more carriers and only the baseband unit (BBU) 442 subunits that have not been disabled.

Figure 9:
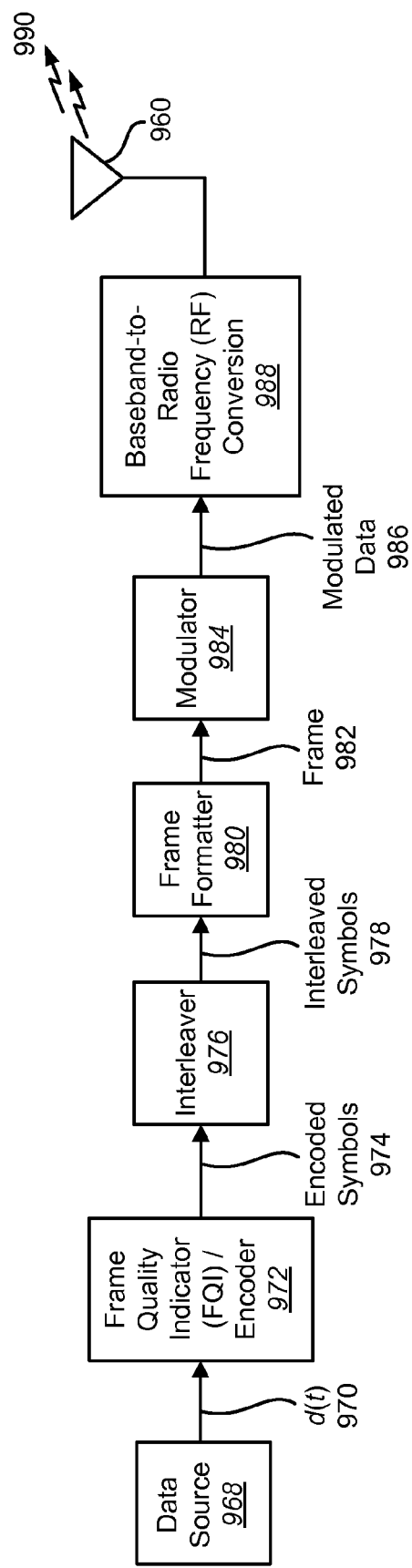
FIG. 9 is a block diagram of a transmitter structure and/or process implemented in a Node B.

FIG. 9 is a block diagram of a transmitter structure and/or process implemented in a Node B 404. The functions and components shown in FIG. 9 may be implemented by software, hardware or a combination of software and hardware. Other functions may be added to FIG. 9 in addition to or instead of the functions shown in FIG. 9.

A data source 968 may provide data d(t) 970 to a frame quality indicator (FQI)/encoder 972. The frame quality indicator (FQI)/encoder 972 may append a frame quality indicator (FQI) such as cyclic redundancy check (CRC) to the data d(t) 970. The frame quality indicator (FQI)/encoder 972 may further encode the data d(t) 970 using one or more coding schemes to provide encoded symbols 974. Each coding scheme may include one or more types of coding, e.g., convolutional coding, Turbo coding, block coding, repetition coding, other types of coding or no coding at all. Other coding schemes may include automatic repeat request (ARQ), hybrid ARQ (H-ARQ) and incremental redundancy repeat techniques. Different types of data may be encoded with different coding schemes.

An interleaver 976 may interleave the encoded data symbols 974 in time to combat fading. The interleaver 976 may output interleaved symbols 978. The interleaved symbols 978 may be mapped by a frame formatter 980 to a pre-defined frame format to produce a frame 982. In one configuration, a frame format may specify the frame as being composed of a plurality of sub-segments. In another configuration, sub-segments may be any successive portions of a frame 982 along a given dimension, e.g., time, frequency, code or any other dimension. A frame 982 may be composed of a fixed plurality of such sub-segments, each sub-segment containing a portion of the total number of symbols allocated to the frame. For example, in a wireless communication system that is configured according to the W-CDMA standard, a sub-segment may be defined as a slot. The interleaved symbols 978 may be segmented into a plurality S of sub-segments making up a frame 982.

A frame formatter 980 may further specify the inclusion of control symbols (not shown) along with the interleaved symbols 978. Such control symbols may include power control symbols, frame format information symbols, etc.

A modulator 984 may modulate the frame 982 to generate modulated data 986. Examples of modulation techniques include binary phase shift keying (BPSK) and quadrature phase shift keying (QPSK). The modulator 984 may also repeat a sequence of modulated data 986.

A baseband-to-radio-frequency (RF) conversion block 988 may convert the modulated data 986 to a radio frequency (RF) signal 990 for transmission via an antenna 960 over a wireless communication link to one or more user equipments (UEs) 116.

Figure 10:
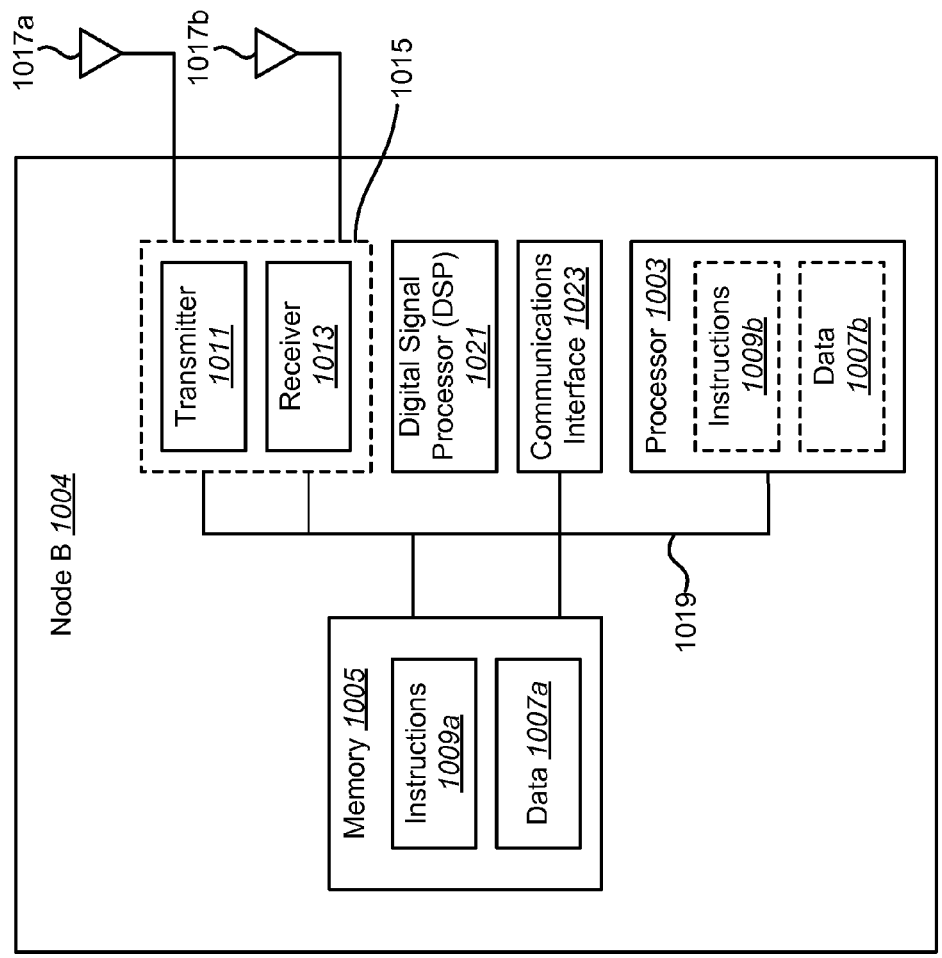
FIG. 10 illustrates certain components that may be included within a Node B.

FIG. 10 illustrates certain components that may be included within a Node B 1004. A Node B 1004 may also be referred to as, and may include some or all of the functionality of, an access point, a broadcast transmitter, a base station, an evolved NodeB, etc. The Node B 1004 includes a processor 1003. The processor 1003 may be a general purpose single- or multi-chip microprocessor (e.g., an ARM), a special purpose microprocessor (e.g., a digital signal processor (DSP)), a microcontroller, a programmable gate array, etc. The processor 1003 may be referred to as a central processing unit (CPU). Although just a single processor 1003 is shown in the Node B 1004 of FIG. 10, in an alternative configuration, a combination of processors (e.g., an ARM and DSP) could be used.

The Node B 1004 also includes memory 1005. The memory 1005 may be any electronic component capable of storing electronic information. The memory 1005 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1007a and instructions 1009a may be stored in the memory 1005. The instructions 1009a may be executable by the processor 1003 to implement the methods disclosed herein. Executing the instructions 1009a may involve the use of the data 1007a that is stored in the memory 1005. When the processor 1003 executes the instructions 1009a, various portions of the instructions 1009b may be loaded onto the processor 1003, and various pieces of data 1007b may be loaded onto the processor 1003.

The Node B 1004 may also include a transmitter 1011 and a receiver 1013 to allow transmission and reception of signals to and from the Node B 1004. The transmitter 1011 and receiver 1013 may be collectively referred to as a transceiver 1015. Multiple antennas 1017a-b may be electrically coupled to the transceiver 1015. The Node B 1004 may also include (not shown) multiple transmitters, multiple receivers, multiple transceivers and/or additional antennas.

The Node B 1004 may include a digital signal processor (DSP) 1021. The Node B 1004 may also include a communications interface 1023. The communications interface 1023 may allow a user to interact with the Node B 1004.

The various components of the Node B 1004 may be coupled together by one or more buses, which may include a power bus, a control signal bus, a status signal bus, a data bus, etc. For simplicity, the various buses are illustrated in FIG. 10 as a bus system 1019.

Figure 11:
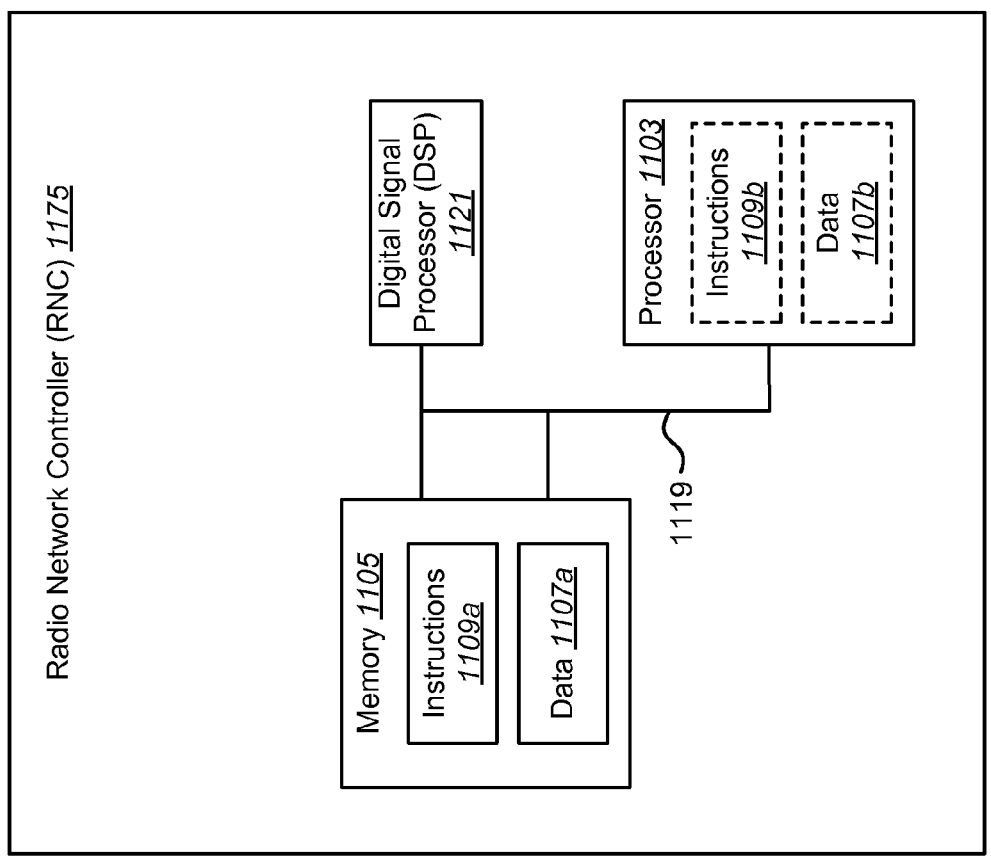
FIG. 11 illustrates certain components that may be included within a radio network controller (RNC).

FIG. 11 illustrates certain components that may be included within a radio network controller (RNC) 1175. A radio network controller (RNC) 1175 is a governing element in the UMTS radio access network (UTRAN) that is responsible for controlling the Node Bs 1004 that are connected to it. The radio network controller (RNC) 1175 may be connected to a circuit switched core network through a media gateway. The radio network controller (RNC) 1175 includes a processor 1103. The processor 1103 may be a general purpose single- or multi-chip microprocessor (e.g., an ARM), a special purpose microprocessor (e.g., a digital signal processor (DSP)), a microcontroller, a programmable gate array, etc. The processor 1103 may be referred to as a central processing unit (CPU). Although just a single processor 1103 is shown in the radio network controller (RNC) 1175 of FIG. 11, in an alternative configuration, a combination of processors (e.g., an ARM and DSP) could be used.

The radio network controller (RNC) 1175 also includes memory 1105. The memory 1105 may be any electronic component capable of storing electronic information. The memory 1105 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1107a and instructions 1109a may be stored in the memory 1105. The instructions 1109a may be executable by the processor 1103 to implement the methods disclosed herein. Executing the instructions 1109a may involve the use of the data 1107a that is stored in the memory 1105. When the processor 1103 executes the instructions 1109a, various portions of the instructions 1109b may be loaded onto the processor 1103, and various pieces of data 1107b may be loaded onto the processor 1103.

The radio network controller (RNC) 1175 may include a digital signal processor (DSP) 1121. The various components of the radio network controller (RNC) 1175 may be coupled together by one or more buses, which may include a power bus, a control signal bus, a status signal bus, a data bus, etc. For the sake of simplicity, the various buses are illustrated in FIG. 11 as a bus system 1119.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 6, 7 and 8, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for reducing energy consumption of a base station, comprising:
    receiving, at the base station, instructions from a radio network controller (RNC) to reduce energy consumption, wherein based on the instructions, the base station performs:
        transmitting a first pilot channel via a first antenna using a first downlink power amplifier;
        transmitting a second pilot channel via a second antenna using a second downlink power amplifier;
        determining that no multiple-input and multiple-output users are in a cell corresponding to the base station; and
        shutting off the second pilot channel and the second downlink power amplifier; and
        transmitting only the first pilot channel via the first antenna using the first downlink power amplifier in response to shutting off the second pilot channel and the second downlink power amplifier.

2. The method of claim 1, wherein the base station is a Node B.

3. The method of claim 1, wherein the method is performed by a radio network controller via instructions sent to the base station.

4. The method of claim 1, wherein the first pilot channel and the second pilot channel are used for multiple-input and multiple-output transmissions to a user equipment.

5. A wireless device configured for reducing energy consumption, comprising:
    a processor configured to receive instructions from a radio network controller (RNC) to reduce energy consumption at the wireless device, wherein based on the instructions, the processor is configured to:
        transmit a first pilot channel via a first antenna using a first downlink power amplifier;
        transmit a second pilot channel via a second antenna using a second downlink power amplifier;
        determine that no multiple-input and multiple-output users are in a cell corresponding to the wireless device; and
        shut off the second pilot channel and the second downlink power amplifier; and transmit only the first pilot channel via the first antenna using the first downlink power amplifier in response to shutting off the second pilot channel and the second downlink power amplifier; and a memory in electronic communication with processor.

6. The wireless device of claim 5, wherein the wireless device is a Node B.

7. The wireless device of claim 5, wherein the wireless device receives instructions from a radio network controller.

8. The wireless device of claim 5, wherein the first pilot channel and the second pilot channel are used for multiple-input and multiple-output transmissions to a user equipment.

9. A wireless device configured for reducing energy consumption, comprising:
   means for receiving instructions from a radio network controller (RNC) to reduce energy consumption at the wireless device;
   means for transmitting, based on the instructions, a first pilot channel via a first antenna using a first downlink power amplifier;
   means for transmitting, based on the instructions, a second pilot channel via a second antenna using a second downlink power amplifier;
   means for determining, based on the instructions, that no multiple-input and multiple-output users are in a cell corresponding to the wireless device; and
   means for shutting off, based on the instructions, the second pilot channel, and the second downlink power amplifier; and
   means for transmitting, based on the instructions, only the first pilot channel via the first antenna using the first downlink power amplifier in response to shutting off the second pilot channel and the second downlink power amplifier.

10. A non-transitory computer-readable medium having instructions for reducing energy consumption of a base station, the instructions comprising:
   code for causing a base station to transmit a first pilot channel via a first antenna using a first downlink power amplifier;
   code for causing the base station to transmit a second pilot channel via a second antenna using a second downlink power amplifier;
   code for causing the base station to determine that no multiple-input and multiple-output users are in a cell corresponding to the base station; and
   code for causing the base station to shut off the second pilot channel and the second downlink power amplifier; and
   code for transmitting only the first pilot channel via the first antenna using the first downlink power amplifier in response to shutting off the second pilot channel and the second downlink power amplifier.

* * * * *